(12) United States Patent
Vincent et al.

(10) Patent No.: US 11,309,981 B2
(45) Date of Patent: Apr. 19, 2022

(54) FLOW SYNCHRONIZATION IN A RECEIVER

(71) Applicant: TDF, Montrouge (FR)

(72) Inventors: David Vincent, Amanlis (FR); Dimitri Fague, Paris (FR)

(73) Assignee: TDF, Montrouge (FR)

( * ) Notice: Subject to any disclaimer, the term of this patent is extended or adjusted under 35 U.S.C. 154(b) by 156 days.

(21) Appl. No.: 16/326,461

(22) PCT Filed: Aug. 11, 2017

(86) PCT No.: PCT/FR2017/052233
§ 371 (c)(1),
(2) Date: Feb. 19, 2019

(87) PCT Pub. No.: WO2018/033683
PCT Pub. Date: Feb. 22, 2018

(65) Prior Publication Data
US 2020/0177293 A1    Jun. 4, 2020

(30) Foreign Application Priority Data

Aug. 19, 2016 (FR) .................................. 16 57835

(51) Int. Cl.
*H04H 20/18* (2008.01)
*H04H 20/20* (2008.01)
(Continued)

(52) U.S. Cl.
CPC .......... *H04H 20/18* (2013.01); *H04H 20/20* (2013.01); *H04H 60/11* (2013.01); *H04L 65/608* (2013.01)

(58) Field of Classification Search
CPC ........ H04H 20/18; H04H 20/20; H04H 60/11; H04L 65/608
See application file for complete search history.

(56) References Cited

U.S. PATENT DOCUMENTS

2002/0167911 A1 * 11/2002 Hickey ............... H04L 49/9094
370/252
2003/0112827 A1 * 6/2003 Cox ........................ H04L 7/005
370/509

(Continued)

FOREIGN PATENT DOCUMENTS

DE    10 2012 221 791 A1    6/2014
EP     2 071 749 A1    6/2009

*Primary Examiner* — Gregory B Sefcheck
*Assistant Examiner* — Joshua Smith
(74) *Attorney, Agent, or Firm* — Faegre Drinker Biddle & Reath LLP

(57) ABSTRACT

A method for synchronizing a first data stream and a second data stream, at least one stream among the first stream and second stream being received by radiofrequency broadcasting and the other stream being received via an IP network, the first and second streams carrying the same service. The method involves receiving a value of the mean offset between the first stream and the second stream; storing the first stream in a first buffer and storing the second stream in a second buffer; extracting a first extract from the first buffer and a second extract from the second buffer, according to the mean offset value received; comparatively analyzing the first extract and the second extract in order to deduce a value of the actual offset between the first stream and the second stream; synchronizing the first stream and second stream according to the actual offset value obtained.

17 Claims, 2 Drawing Sheets

(51) Int. Cl.
    *H04H 60/11*     (2008.01)
    *H04L 65/65*     (2022.01)

(56) References Cited

U.S. PATENT DOCUMENTS

| | | | |
|---|---|---|---|
| 2004/0057543 A1* | 3/2004 | Huijgen | H04J 3/0682 375/356 |
| 2006/0015945 A1* | 1/2006 | Fields | H04L 67/2823 726/27 |
| 2007/0050658 A1* | 3/2007 | Kuwata | H04L 7/0008 713/503 |
| 2008/0019293 A1* | 1/2008 | Chang | H04W 88/16 370/310 |
| 2010/0115569 A1* | 5/2010 | Takimoto | H04H 20/24 725/110 |
| 2011/0064049 A1 | 3/2011 | Jeon et al. | |
| 2013/0004158 A1* | 1/2013 | Goldfarb | H04B 10/612 398/25 |
| 2013/0084063 A1* | 4/2013 | Hu | H04L 49/10 370/219 |
| 2013/0151693 A1* | 6/2013 | Baker | H04L 43/08 709/224 |
| 2015/0109411 A1* | 4/2015 | Lee | H04N 19/597 348/43 |
| 2015/0180586 A1* | 6/2015 | Oota | H04L 25/0224 398/27 |
| 2015/0365202 A1* | 12/2015 | Kudo | H04L 12/189 370/312 |
| 2016/0142343 A1* | 5/2016 | Tongle | H04L 49/9057 370/474 |
| 2018/0124729 A1* | 5/2018 | Hanson | H04W 56/0045 |

* cited by examiner

FLOW SYNCHRONIZATION IN A RECEIVER

CROSS-REFERENCE TO RELATED APPLICATIONS

This application is the U.S. national phase of the International Patent Application No. PCT/FR2017/052233 filed Aug. 11, 2017, which claims the benefit of French Application No. 16 57835 filed Aug. 19, 2016, the entire content of which is incorporated herein by reference.

FIELD

The disclosure relates to the field of distribution of audio or video streams, and more particularly the synchronization of streams from different sources.

BACKGROUND

It finds applications in terminals for receiving audio or video, in particular terminals able to receive audio or video data carried by means of different technologies.

It is currently possible to switch between two FM transmissions (Frequency Modulation), or between an FM broadcast (synchronous RDS/FM, RDS for Radio Data System) and a digital broadcast DB (standards DAB for Digital Audio Broadcasting or DMB for Digital Multimedia Broadcasting).

It is thus required that the audio streams be synchronized (FM/FM switching) or with small and constant offsets (FM/DB switching).

In addition, it is now possible to listen to radio by IP streaming (IP=Internet Protocol) on terminals that also have a connection to an IP network via a Wi-Fi interface or a 3G or 4G mobile network for example. Such transmission of audio streams requires the use of a buffer in the receiving terminal, which causes a delay in the radio reception.

New streaming modes such as HLS (HTTP Live Streaming), HSS (Home Subscriber Service), and DASH (Dynamic Adaptive Streaming over HTTP) rely on the use of small files of a few seconds of audio data, called "chunks", which result in a variable offset relative to the data distributed live via DB or FM, depending on when the user connects.

Thus, listening to a radio transmission via IP streaming that uses chunks introduces the use of buffers of varying sizes.

In addition, it is currently not possible to synchronize this IP radio stream with an FM or DB broadcast.

Switching between a DB or FM broadcasting mode and IP streaming therefore results in an audio offset of several seconds. Such an offset may consist of losing a few seconds (from IP streaming to FM or DB broadcasting) or repeating a few seconds (from FM or DB broadcasting to IP streaming).

In addition, switching from broadcasting mode to IP streaming and vice versa can be problematic when the content broadcast in DB or FM is specific to the area of reception (local radio program for example), which is not the case in IP streaming.

The contents of the programs broadcast in DB or FM and of those carried by IP streaming are therefore different, and a switch between a radio broadcasting mode and IP streaming cannot be transparent to the user.

The present disclosure improves the situation.

SUMMARY

A first aspect of the disclosure relates to a method for synchronizing a first data stream and a second data stream, implemented in a receiver, at least one stream among the first stream and second stream being received by radiofrequency broadcasting and the other stream being received via an IP network, the first and second streams carrying a same service, the method comprising:

receiving a value of the mean offset between the first stream and the second stream;

storing the first stream in a first buffer and storing the second stream in a second buffer;

extracting a first extract from the first buffer and a second extract from the second buffer, according to the mean offset value received;

comparatively analyzing the first extract and the second extract in order to deduce a value of the actual offset between the first stream and the second stream;

synchronizing the first stream and second stream according to the actual offset value obtained.

It is thus possible to synchronize an IP stream with a broadcast stream, such as an FM or DB/DAB stream, or even DRM (for Digital Radio Mondiale) or HD Radio, thus enabling a switch from one stream to another which is transparent to the user without causing a repetition or loss of data.

According to one embodiment, the preceding steps are implemented during a rendering of the first stream, and the method further comprises, following the synchronization of the first stream and second stream, a step of switching from the rendering of the first stream to a rendering of the second stream.

Rendering is understood to mean any transformation of a stream into sound data (audio stream) or sound and video data (video stream) for the user of the receiver.

Thus, the synchronization is implemented even when one of the streams is rendered at the user, and a switch from one stream to another can thus be done at any time in a manner that is transparent to the user.

In addition, the rendering of the first stream and second stream may comprise adding samples from the first buffer or second buffer to a rendering buffer.

In addition, if the first stream is ahead of the second stream, the synchronization of the first stream and second stream comprises delaying the first stream being rendered by adding samples to the rendering buffer, until the introduced delay is equal to the value of the actual offset between the first stream and the second stream.

Thus, the synchronization between streams can be done when the first stream is ahead of the second stream, for example when the first stream is an FM or DB/DAB type of broadcast stream and when the second stream is an IP stream. As the introduction of samples is imperceptible or barely noticeable to the user, the quality of the stream being rendered is not degraded during synchronization.

In a variant, if the first stream is ahead of the second stream, the synchronization of the first stream and second stream comprises decreasing the read frequency from the rendering buffer, until the introduced delay is equal to the value of the actual offset between the first stream and the second stream.

Thus, the synchronization between streams can be done when the first stream is ahead of the second stream, for example when the first stream is an FM or DB/DAB type of broadcast stream and when the second stream is an IP stream. The stream being rendered is slightly slowed (for example, the output frequency from the rendering buffer can be decreased from 48 kHz to 47 kHz) in a manner that is barely noticeable to the user.

Alternatively, if the first stream is behind the second stream, the synchronization of the first stream and second stream comprises moving a read cursor in the second buffer by a number of samples corresponding to the value of the actual offset between the first stream and the second stream, and the samples from the second buffer added to the rendering buffer can be indicated by the moved read cursor.

Thus, the synchronization between streams can be done when the first stream is behind the second stream, for example when the first stream is an IP stream and when the second stream is an FM or DB/DAB type of broadcast stream.

According to one embodiment, the extraction, comparative analysis, and synchronization steps are implemented after a step of detecting that the reception quality of the first stream is less than a first predetermined threshold.

Thus, the synchronization can anticipate a future probable switch from one stream to another due to degradation in the quality of the stream being rendered.

In addition, the switch from a rendering of the first stream to a rendering of the second stream is implemented after a step of detecting that the reception quality of the first stream is less than a second predetermined threshold, said second threshold being lower than first threshold.

Thus, the switch can be automated so as to ensure the rendering of a stream of sufficient reception quality. For example, the reception quality may be measured by an indicator such as the signal-to-noise ratio.

In a variant, the switch may be implemented after a step of receiving a command to switch from the first stream to the second stream, from a user selection interface.

The user can thus advantageously choose one or the other of the streams without the switch impacting continuity in the rendering of the service.

According to one embodiment, the mean offset value is received from a service platform, via the IP network.

Thus, the service platform can be aware of mean offset values between the different streams of a same service, and can so inform the receiver so that it can carry out the stream synchronization.

In addition, the method may further comprise a prior step of sending a request to the service platform, the request identifying the service carried by the first and second streams.

The service platform thus sends the mean offset value only upon request from the receiver, which reduces congestion in the network carrying the request and mean offset value.

In addition, the request may further identify a location of the receiver, and the method may further comprise the receiving, from the service platform, of a URL for accessing via the IP network the service corresponding to the location of the receiver.

Thus, even in the case of receiving streams broadcast within the context of a local service, dependent on the location of the receiver, the received IP stream can convey the same content, which allows continuity of service in the event of a switch from one stream to another.

According to one embodiment, the mean offset value is received cyclically from the service platform.

The service platform can thus regularly update the mean offset values, which allows fine-tuned synchronization of the streams of a same service.

A second aspect relates to a computer program product comprising program code instructions stored on a computer-readable medium, for executing the steps of the method according to the first aspect of the disclosure.

Another aspect relates to a receiver for synchronizing a first data stream and a second data stream, at least one stream among the first stream and second stream being received by radiofrequency broadcasting and the other stream being received via an IP network, the first and second streams carrying a same service, said receiver comprising:
- an interface for receiving a value of the mean offset between the first stream and the second stream;
- at least a first buffer for storing the first stream and a second buffer for storing the second stream;
- a calculation module comprising a processor configured to extract a first extract from the first buffer and a second extract from the second buffer, as a function of the mean offset value received, and to perform a comparative analysis of the first extract and the second extract in order to deduce a value of the actual offset between the first stream and the second stream;
- a synchronization module comprising a processor configured to synchronize the first stream and second stream according to the actual offset value obtained.

BRIEF DESCRIPTION OF THE DRAWINGS

Other features and advantages will be apparent from examining the detailed description below, and the accompanying drawings in which.

DETAILED DESCRIPTION

Figure 1:
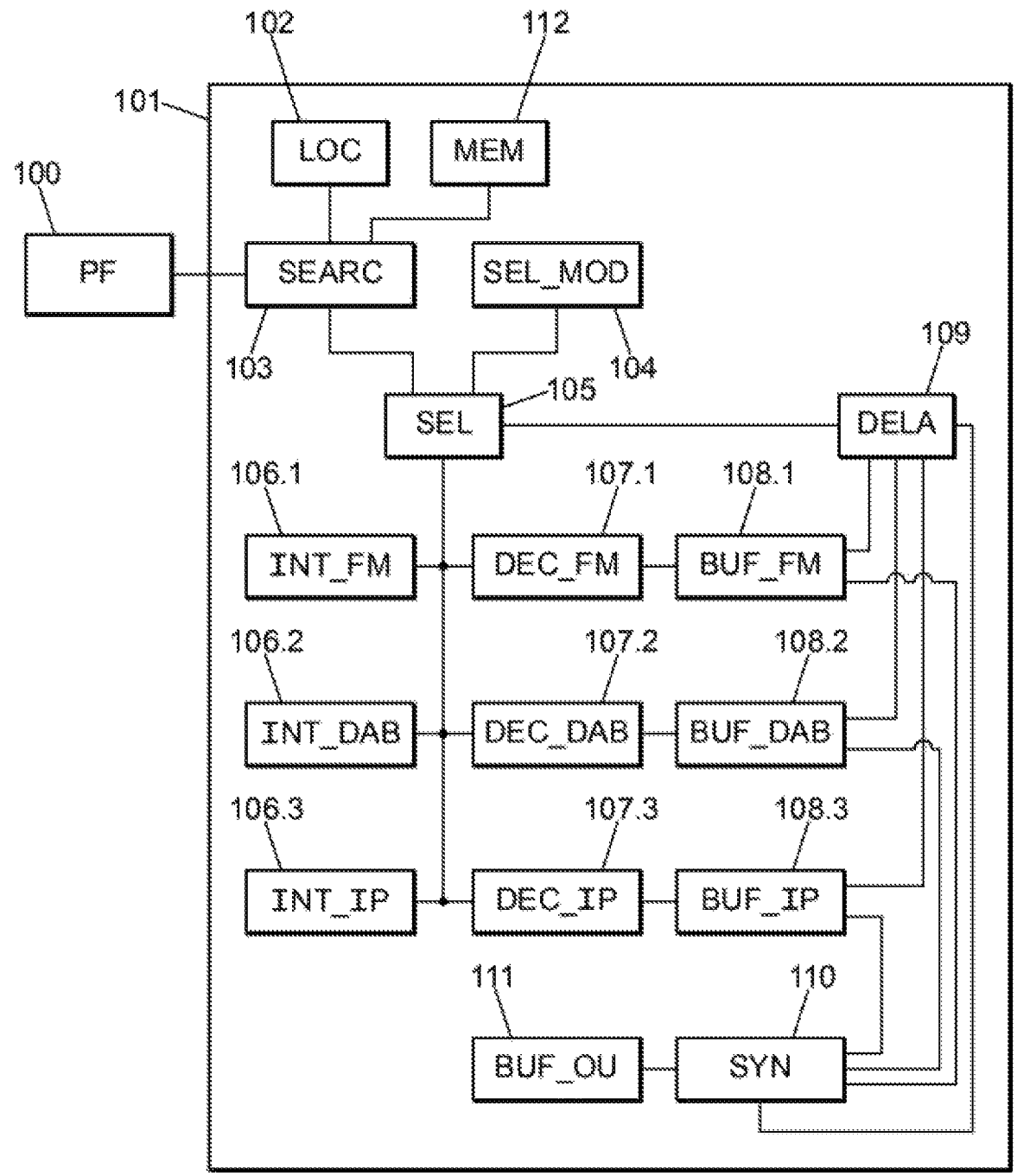
FIG. 1 illustrates a data flow synchronization system according to an embodiment.

FIG. 1 shows a synchronization system according to an embodiment.

The system comprises a service platform 100 capable of communicating with an audio/video receiver 101. The audio/video receiver 101 may for example access the service platform 100 via an IP network, such as the Internet.

In the remainder of the description, the example of a radio receiver is considered; this is for illustrative purposes only. It is understood that the disclosure equally applies to the reception of video data.

The radio receiver 101 comprises a location module 102, for example GPS type (for Global Positioning System), able to obtain location data for the receiver 101. For example, when the radio receiver 101 is a car radio or a smart phone, a GPS function is generally available. Alternatively, the radio receiver 101 may be located using the list of broadband programs available or by detecting a local FM or DAB radio station.

The radio receiver 101 further comprises a search module 103 able to determine the set of broadcast services available for the radio receiver 101, based on the location of the radio receiver 101. For this purpose, the search module 103 may scan all the frequency bands that it supports as well as all the modulations (for example AM, FM, DAB, DRM). In addition, once the list of broadcast services is created, the search module 103 is able to determine whether or not an access to the IP network is available (via a mobile network or a Wi-Fi terminal for example).

In the case where access to the IP network is available, the search module may obtain URLs associated with the available broadcast services of the list, from the service platform 100. In one embodiment, only the URL associated with the service currently being rendered on the radio receiver 101 is transmitted by the service platform 100, following the receipt of a request identifying the service being broadcast. Alternatively, upon receiving a request from the radio receiver 101, with the request identifying all the services available for the radio receiver 101, the service platform 100 transmits all the URLs associated with the available services, which makes it possible to limit the number of requests in the IP network. In addition, the radio receiver 101 may transmit an identifier for its location (GPS coordinates for example) to the service platform, via a request, so that the URLs received allow accessing a local service corresponding to the identified location.

The list of available broadcast services may be further enriched by adding services available only by IP, such as services related to the location of the radio receiver 101.

In addition, the search module 103 may obtain mean offset values from the service platform 100. For this purpose, the search module 103 may integrate an interface for communicating with the search module 103. The interface in question may be grouped with an IP interface 106.3, described below, in the case where the service platform 100 is accessible via an IP network.

For example, the search module 103 may obtain:
 a first value of the mean offset between the FM broadcast of a first service and the transmission via the IP network of the same first service;
 a second value of the mean offset between the DAB broadcast of the first service and the transmission via the IP network of the same first service.

The mean offset values may be transmitted by the service platform 100 for a given set of services, on a regular basis, at a first frequency.

The use of the mean offset on the receiver side enables, among other things:
 initializing the buffers for storing the audio samples to respective appropriate sizes and enabling the radio receiver to verify that it has sufficient resources;
 restricting the audio ranges to be used for the fine-tuned synchronization and thus limiting the processor resources needed to achieve synchronization:
 deciding which audio stream or streams are to be slowed relative to another audio stream, before the actual offset value is known (this is impossible if the offset calculation is done only on the receiver side);
 giving priority to starting to render audio on the most delayed stream in order to facilitate synchronization (it is then not necessary to slow down one of the streams);
 performing an approximate synchronization (alternatively, without using fine-tuned synchronization involving calculation of the actual offset value) which reduces the processor resources required in the receiver.

Alternatively, the mean offset values are transmitted by the service platform 100 after receiving a request from the search module 103.

In a variant, the search module 103 identifies in the request the service being rendered on the radio receiver 101. The service platform 100 can thus transmit only the mean offset values relating to the service being rendered, reducing the load in the IP network.

The data transmitted by the service platform 100 may be encrypted in order to avoid transmitting modified information.

The receiver 101 may comprise a memory 112 for storing in particular the mean offset values and the URLs received from the service platform 100.

The receiver 101 may further comprise a user selection interface 104, such as a user interface for selecting a service from the list of available services, and optionally enabling the selection of one of the streams corresponding to the service (DAB stream, IP stream, FM stream, etc.).

No restrictions are placed on the selection interface, which may be a touch screen or may comprise a set of buttons.

The radio receiver 101 may further comprise a source selection module 105. The source selection module 101, based on the service selected by the user via the user selection interface 104, may select one of the streams corresponding to the service. For example, if the current stream being rendered is an IP stream, but the IP network coverage decreases (signal quality below a predetermined threshold for example), the source selection module 101 can initiate a switch to another source (DAB or FM stream). Conversely, when the current stream is a broadcast stream (DAB or FM) and a signal quality is less than a threshold $th_1$, a switch to the IP stream can be initiated by the source selection module 105. The reception quality may be measured by an indicator such as the signal-to-noise ratio SNR.

Alternatively, when the user has selected a stream via the user selection interface 104, the user-selected stream is selected by the source selection module 105.

The source selection module 105 is also suitable for configuring an FM interface 106.1, a DAB interface 106.2, and an IP interface 106.3, so that they receive respective streams corresponding to the selected service. In order to not receive the IP stream continuously (cost and battery consumption limitations for example), and when the stream currently being rendered is a broadcast stream (DAB or FM stream), the source selection module 15 may activate the IP interface 106.3 only when the reception quality of the DAB or FM signal is lower than a threshold $th_2$, where $th_2$ is greater than $th_1$.

In addition, based on the mean offset values received from the service platform 100, the source selection module 105 may adjust the size of the buffers 108.1, 108.2, and 108.3.

An FM buffer 108.1 is suitable for temporarily storing audio samples from an FM decoder 107.1 receiving the FM stream from the FM interface 106.1.

A DAB buffer 108.2 is suitable for temporarily storing audio samples from a DAB decoder 107.2 receiving the DAB stream from the DAB interface 106.2.

An IP buffer 108.3 is suitable to temporarily storing audio samples from an IP decoder 107.3 receiving the IP stream from the IP interface 106.3.

The FM decoder 107.1 is able to decode the service selected in FM reception and to output decoded audio samples, for example in PCM format (for Pulse Code Modulation).

The DAB decoder 107.2 is able to decode the service selected in DAB reception and to output decoded audio samples, for example in PCM format.

The IP decoder 107.3 is able to decode the service selected in IP reception and to output decoded audio samples, for example in PCM format.

The buffers 108.1 to 108.3 can store decoded audio samples to a depth sufficient for resynchronizing the different streams of the selected service. The depths (or sizes) of the buffers are determined based on the mean offset values received from the service platform 100. For example, if a mean offset A is indicated between the FM and IP streams of the same service, with the FM stream being ahead of the IP stream, the size of the FM buffer 108.1 can be increased to a number of samples at least equal to the size of the IP buffer 108.3 plus the mean offset value Δ.

The audio receiver 101 further comprises a calculation module 109 suitable for determining at least one value of the actual offset between two streams of the same service. For this purpose, a first audio extract (a set of samples) from a first buffer and a second audio extract from a second buffer may be compared in order to deduce an actual offset value.

The extraction of the first audio extract and the second audio takes into account the value of the mean offset between the streams from which they originate, as will be better understood in the following.

Advantageously, the first audio extract and the second audio comprise the same number k of samples, or a similar number of samples (for example, if the first audio extract comprises n samples, the second audio extract comprises m, with $0.9*n<m<1.1*n$), which reduces the complexity of the comparison by the calculation module 109.

For example, in the case of synchronization of an IP stream and an FM stream of the same service, the value of the mean offset between these streams, transmitted by the service platform 100, may indicate that the FM stream is n seconds ahead of the IP stream. The duration of n seconds can be converted to an M number of samples based on the sampling frequency of the FM and IP decoders 107.1 and 107.3.

Based on the number M of samples corresponding to the mean offset value, a read cursor may be moved in one of the buffers.

For example, in the above example where the FM stream is ahead of the IP stream, the k samples following the sample of index M are thus extracted from the FM buffer 107.1 and the k first IP samples are extracted from the IP buffer 107.2, in order to compare these extracts in the calculation module 109 and deduce from the comparison the value of the actual offset between the IP stream and the FM stream.

The actual offset value thus indicates the actual offset between two streams of the same service, to the nearest sample.

The audio receiver 101 further comprises a synchronization module 110 able to take as input the buffers 108.1 to 108.3 for the different sources (streams of the same service) and to construct an output stream stored in a rendering buffer 111, by adding samples from buffers 108.1 to 108.3 to the rendering buffer 111.

The synchronization module 110 is able in particular to synchronize a first stream and a second stream, on the basis of the actual offset value received from the calculation module 109, in order to switch from a rendering of the first stream to a rendering of the second stream, and to do so without degradation of service when switching from one source to another.

For example, when the first stream is ahead of the second stream (for example the first stream is an FM stream while the second stream is an IP stream), the synchronization module 110 can delay the audio stream output from the rendering buffer 111, for example:
- by adding samples to the rendering buffer 111, in addition to the samples coming from the buffer of the first stream, until the introduced delay is equal to the value of the actual offset between the first stream currently being rendered and the second stream,
- by decreasing a read frequency from the rendering buffer 111, until the introduced delay is equal to the value of the actual offset between the first stream and the second stream.

When the first stream being rendered is behind the second stream (for example the first stream is the IP stream and the second stream is a broadcast stream), synchronization of the first stream and second stream comprises the movement of a read cursor in the second buffer of the second stream by a number of samples corresponding to the value of the actual offset between the first stream and the second stream. Thus, the samples of the second buffer added to the rendering buffer 111 are indicated by the moved read cursor.

Once the first and second streams are synchronized, the synchronization module 110 can switch from the first stream to the second stream by supplying the rendering buffer 111 with samples from the second stream.

Figure 2:
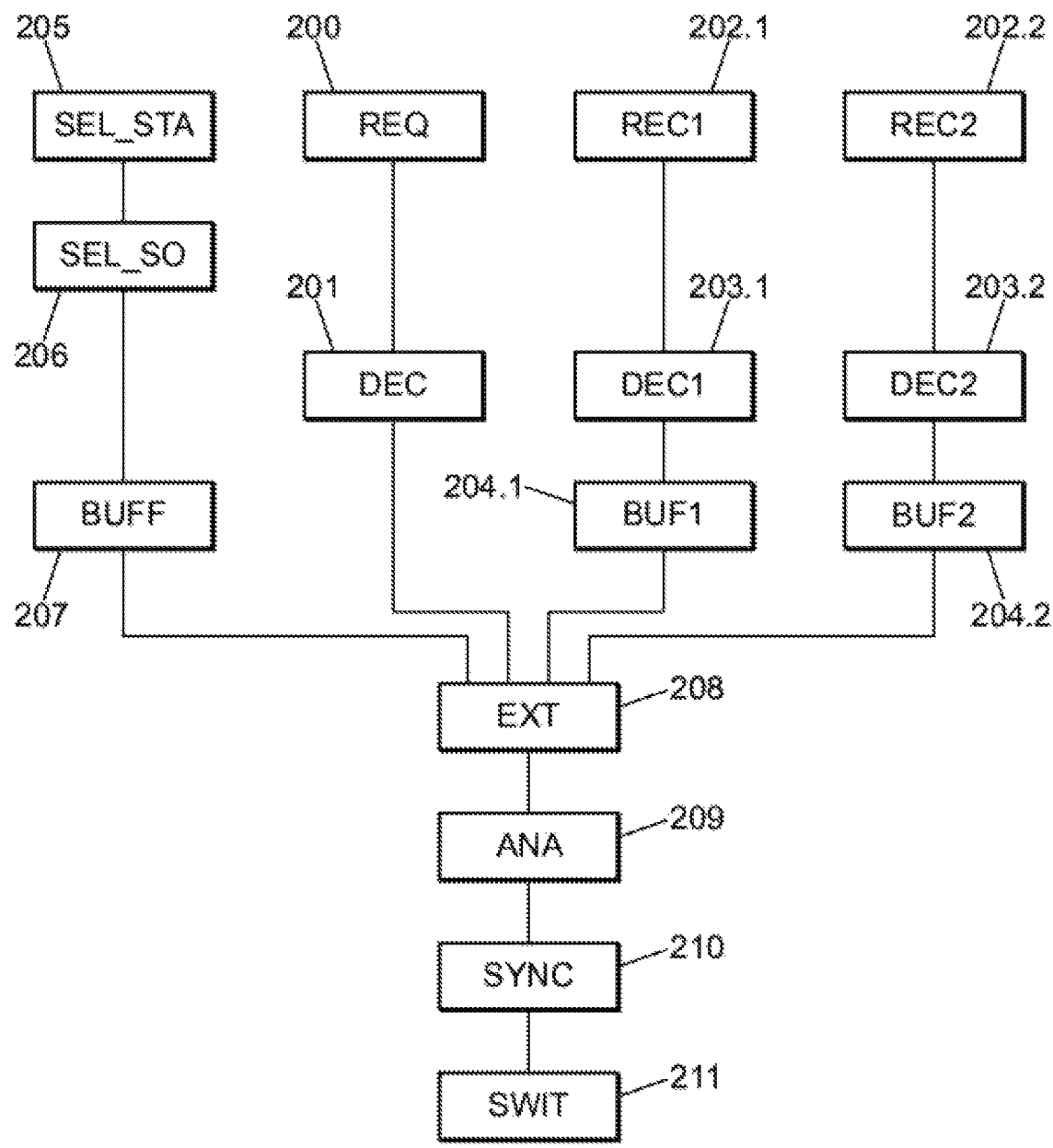
FIG. 2 is a diagram illustrating the steps of a data flow synchronization method according to an embodiment.

FIG. 2 is a diagram illustrating the steps of a synchronization method according to an embodiment.

In an optional step 200, the search module 103 sends a request for the mean offset values, as described above.

In a step 201, the service platform 100 sends the mean offset values to the audio receiver 101. Step 200 is not implemented in the embodiment where step 201 is implemented cyclically. In addition, in step 201, the audio receiver may receive, from the service platform 100, a URL for accessing an IP stream corresponding to a service currently being rendered (via a DAB or FM stream) on the radio receiver 101, or a list of URLs for accessing IP streams respectively corresponding to the services accessible by the audio receiver 101.

In parallel with steps 200 and 201, the audio receiver 101 receives a first stream in a step 202.1 and a second stream in a step 202.2. As previously explained, the first and second streams are received by separate interfaces 106.1 to 106.3 and correspond to the same service (the same radio station for example). The first and second streams are respectively decoded by two of the decoders 107.1 to 107.3 in steps 203.1 and 203.2, then stored in two of the buffers 108.1 to 108.3 in steps 204.1 and 204.2. Steps 202 to 204 are carried out continuously.

As previously indicated, the reception of an IP stream may be dependent on a comparison between a reception quality value of a broadcast stream (DAB or FM) currently being rendered and the threshold $th_2$.

In a step 205, in parallel with steps 200 to 204 described above, the user can select a service via the user selection interface 104. When the user wishes to switch from a service to a new service (from one radio station to another for example), the interfaces 106.1 to 106.3 are reconfigured for receiving the new service.

In a step 206, the source selection module 105 configures the FM 106.1, DAB 106.2, and IP 106.3 interfaces to receive respective streams corresponding to the selected service, and selects one of the streams. The selection of a stream may be determined based on a user selection via the user selection interface 104, or may occur either by default or according to the reception qualities of the respective streams, particularly in a context of switching from a first stream to a second stream. In what follows, we consider an example of switching from a first stream to a second stream.

In an optional step 207, the source selection module 105 may adjust a buffer size 108.1, 108.2, and 108.3 based on the mean offset value concerning the first and second streams and received from the service platform 100 in step 200, as previously described.

In a step 208, the calculation module 109 extracts a first audio extract and a second audio extract from the buffers storing the first and second streams to be synchronized, as a function of the received offset value concerning the first and second streams.

In a step 209, the calculation module 109 carries out a comparative analysis of the first extract and second extract in order to deduce a value of the actual offset between the first and second streams.

In a step 210, the first and second streams are synchronized by the synchronization module 110 on the basis of the actual offset value calculated by the calculation module 109, as previously detailed.

In a step 111, once the first and second streams are synchronized, the synchronization module 110 switches from the first to the second stream, while supplying the rendering buffer 111 with samples from the second buffer storing the second stream, as previously explained.

The synchronization module 110, the source selection module 105, and the calculation module 109 may each comprise a processor and an internal memory, for the implementation of the above steps.

The diagram of FIG. 2 also illustrates a flowchart for code instructions comprised in a computer program product and stored on a computer-readable medium.

The invention claimed is:

1. A method for synchronizing a first data stream and a second data stream, implemented in a receiver, said method comprising:
   receiving the first stream;
   receiving the second stream, at least one stream among the first stream and second stream being received by radiofrequency broadcasting and the other stream being received via an IP network, the first and second streams carrying a same service;
   receiving a value of the mean offset between the first stream and the second stream, said value indicating that the first stream is ahead of the second stream;
   adjusting sizes of a first buffer and a second buffer such that the first buffer is at least equal to the size of the second buffer plus the mean offset value;
   storing the first stream in the first buffer and storing the second stream in the second buffer;
   extracting:
     a first extract from the first buffer, starting extracting in the first buffer at a point corresponding to the mean offset value, and
     a second extract from the second buffer;
   comparatively analyzing the first extract and the second extract in order to deduce a value of the actual offset which indicates an actual offset between the first stream and the second stream;
   synchronizing the first stream and second stream according to the actual offset value obtained synchronizing comprises introducing a delay equal to the value of the actual offset to the first stream when rendering the first stream or moving a read cursor in the first buffer by a number of samples corresponding to the value of the actual offset when rendering the second stream.

2. The synchronization method according to claim 1, wherein the preceding acts are implemented during a rendering of the first stream, said method further comprising, following the synchronization of the first stream and second stream, an act of switching from the rendering of the first stream to a rendering of the second stream.

3. The method according to claim 2, wherein the rendering of the first stream and second stream comprises adding samples from the first buffer or second buffer to a rendering buffer.

4. The method according to claim 3, wherein the synchronization of the first stream and second stream comprises delaying the first stream being rendered by adding samples to the rendering buffer, until the introduced delay is equal to the value of the actual offset between the first stream and the second stream.

5. The method according to claim 3, wherein the synchronization of the first stream and second stream comprises decreasing the read frequency from the rendering buffer, until the introduced delay is equal to the value of the actual offset between the first stream and the second stream.

6. The synchronization method according to claim 1, wherein the preceding acts are implemented during a rendering of the second stream, said method further comprising, following the synchronization of the first stream and second stream, an act of switching from the rendering of the second stream to a rendering of the first stream.

7. The method according to claim 6, wherein the rendering of the first stream and second stream comprises adding samples from the first buffer or second buffer to a rendering buffer.

8. The method according to claim 7, wherein the synchronization of the first stream and second stream comprises moving a read cursor in the first buffer by a number of samples corresponding to the value of the actual offset between the first stream and second stream,
   wherein the samples from the first buffer added to the rendering buffer are indicated by the moved read cursor.

9. The method according to claim 1, wherein the extraction, comparative analysis, and synchronization acts are implemented after an act of detecting that the reception quality of the stream being rendered is less than a first predetermined threshold.

10. The method according to claim 2, wherein the switch between the rendering of the first stream and the rendering of the second stream is implemented after an act of detecting that the reception quality of the stream being rendered is less than a second predetermined threshold, said second threshold being lower than the first threshold.

11. The method according to claim 2, wherein the switch is implemented after an act of receiving a command to switch between the first stream and the second stream, from a user selection interface.

12. The method according to claim 1, wherein the mean offset value is received from a service platform, via the IP network.

13. The method according to claim 12, further comprising a prior act of sending a request to the service platform, said request identifying the service carried by the first and second streams.

14. The method according to claim 13 wherein the request further identifies a location of the receiver, and further comprising the receiving, from the service platform, of a URL for accessing via the IP network the service corresponding to the location of the receiver.

15. The method according to claim 12, wherein the mean offset value is received cyclically from the service platform.

16. A non-transitory computer-readable medium comprising instructions stored thereon, for executing the acts of the method according to claim 1.

17. A receiver for synchronizing a first data stream and a second data stream, said receiver comprising:
   an interface for receiving the first stream;
   an interface for receiving the second stream, at least one stream among the first stream and second stream being received by radiofrequency broadcasting and the other stream being received via an IP network, the first and second streams carrying a same service;

an interface for receiving a value of the mean offset between the first stream and the second stream;

at least a first buffer for storing the first stream and a second buffer for storing the second stream;

a calculation module comprising a processor configured:
to adjust the sizes of the first buffer and the second buffer such that the first buffer is at least equal to the size of the second buffer plus the mean offset value,
to extract a first extract from the first buffer, starting the extract in the first buffer at a point corresponding to the mean offset value, and a second extract from the second buffer, and
to perform a comparative analysis of the first extract and the second extract in order to deduce a value of the actual offset which indicates an actual offset between the first stream and the second stream;

a synchronization module comprising a processor configured to synchronize the first stream and second stream according to the actual offset value obtained, said synchronizing comprises introducing a delay equal to the value of the actual offset to the first stream when rendering the first stream or moving a read cursor in the first buffer by a number of samples corresponding to the value of the actual offset when rendering the second stream.

* * * * *